United States Patent
Lin

(10) Patent No.: US 11,653,346 B2
(45) Date of Patent: *May 16, 2023

(54) BEAM SELECTION AND RESOURCE ALLOCATION FOR BEAM-FORMED RANDOM ACCESS PROCEDURE

(71) Applicant: MEDIATEK INC., Hsin-Chu (TW)

(72) Inventor: Guan-Yu Lin, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 101 days.

This patent is subject to a terminal disclaimer.

(21) Appl. No.: 17/172,224
(22) Filed: Feb. 10, 2021

(65) Prior Publication Data

US 2021/0168787 A1 Jun. 3, 2021

Related U.S. Application Data

(63) Continuation of application No. 16/373,881, filed on Apr. 3, 2019, now Pat. No. 10,939,442.
(Continued)

(51) Int. Cl.
*H04W 72/04* (2009.01)
*H04W 16/28* (2009.01)
H04W 24/04 (2009.01)
*H04W 24/08* (2009.01)
*H04W 72/14* (2009.01)
*H04W 74/02* (2009.01)
*H04W 74/08* (2009.01)
(Continued)

(52) U.S. Cl.
CPC ......... *H04W 72/046* (2013.01); *H04W 16/28* (2013.01); *H04W 24/04* (2013.01);
(Continued)

(58) Field of Classification Search
CPC ... H04W 72/046; H04W 76/11; H04W 16/28; H04W 24/04; H04W 24/08; H04W 72/14; H04W 74/02; H04W 74/0833
See application file for complete search history.

(56) References Cited

U.S. PATENT DOCUMENTS 10,939,442 B2 * 3/2021 Lin ...................... H04W 74/02
2018/0014332 A1 1/2018 Lee et al.
(Continued)

FOREIGN PATENT DOCUMENTS

| CN | 101478792 A | 1/2008 |
|---|---|---|
| WO | WO2016086144 A1 | 11/2014 |
| WO | WO2017127126 A1 | 1/2016 |

OTHER PUBLICATIONS

International Search Report and Written Opinion of International Search Authority for PCT/CN2019/081764 dated Jun. 4, 2019 (9 pages).
(Continued)

*Primary Examiner* — Jay L Vogel
(74) *Attorney, Agent, or Firm* — Imperium Patent Works; Zheng Jin

(57) ABSTRACT

Solutions are proposed to handle PRACH resource and beam selection under the following scenarios. First, a CFRA procedure is initiated, but all beams associated with the CFRA resource is below a RSRP threshold and CBRA fallback is not supported. UE continues to perform CFRA by selecting any downlink beam associated with dedicated PRACH resource, and then select dedicated PRACH resource associated with the selected downlink beam; second, a CFRA procedure is initiated but the active UL BWP is not paired with the active DL BWP. Upon CFRA initiation, UE uses current active UL and DL BWP to perform CFRA, and switches to another BWP pair upon all beams associated with the CFRA resource are below a RSRP threshold; third, a CBRA procedure is initiated but the active UL BWP is not configured with PRACH resource. UE selects a special UL/DL BWP to perform the CBRA procedure.

8 Claims, 5 Drawing Sheets

Related U.S. Application Data

(60) Provisional application No. 62/653,561, filed on Apr. 6, 2018.

(51) Int. Cl.
    *H04W 76/11* (2018.01)
    *H04W 48/14* (2009.01)
    *H04W 74/00* (2009.01)
    *H04W 72/044* (2023.01)

(52) U.S. Cl.
    CPC ........... *H04W 24/08* (2013.01); *H04W 72/14* (2013.01); *H04W 74/02* (2013.01); *H04W 74/0833* (2013.01); *H04W 76/11* (2018.02); *H04W 48/14* (2013.01); *H04W 74/006* (2013.01)

(56) References Cited

U.S. PATENT DOCUMENTS

| | | | |
|---|---|---|---|
| 2019/0052339 A1* | 2/2019 | Zhou | H04W 52/40 |
| 2019/0104549 A1 | 4/2019 | Deng et al. | |
| 2019/0280756 A1* | 9/2019 | Fan | H04W 76/19 |
| 2021/0076445 A1* | 3/2021 | Tsai | H04L 5/003 |
| 2021/0168678 A1* | 6/2021 | Deenoo | H04W 36/0085 |

OTHER PUBLICATIONS

R2-1802151 3GPP TSG-RAN WG2 #101, CATT, "Beam failure recovery", Athens, Greece, Feb. 26-Mar. 2, 2018 (5 pages).
Taiwan IPO, office action for the TW patent application 108112131 (no English translation is available) dated Jul. 10, 2020 (15 pages).
R2-1803572 3GPP TSG-RAN WG2 Meeting, Qualcomm Incorporated, Selection between CFRA and CBRA for BFR, Athens, Greece, Feb. 26-Mar. 2, 2018 (5 pages) *section 2.2*.
R2-1803871 3GPP TSG-RAN WG2 #101, Ericsson (Rapporteur), Summary of BWP linkage for Random Access, Athens, Greece, Feb. 26-Mar. 2, 2018 (4 pages) *section 2.1.1*.
R2-1803203 3GPP TSG-RAN WG2 #101, Ericsson, BWP selection and RA, Athens, Greece, Feb. 26-Mar. 2, 2018 (7 pages) *section 2, 2.1, 3*.
R2-1803061 3GPP TSG-RAN WG2 Meeting #101, MediaTek Inc., BWP ambiguilty for contention-based RACH procedure, Athens, Greece, Feb. 26-Mar. 2, 2018 (3 pages) the whole document.

* cited by examiner

BEAM SELECTION AND RESOURCE ALLOCATION FOR BEAM-FORMED RANDOM ACCESS PROCEDURE

CROSS REFERENCE TO RELATED APPLICATIONS

This application is a continuation, and claims priority under 35 U.S.C. § 120 from nonprovisional U.S. patent application Ser. No. 16/373,881, entitled "BEAM SELECTION AND RESOURCE ALLOCATION FOR BEAM-FORMED RANDOM ACCESS PROCEDURE," filed on Apr. 3, 2019, the subject matter of which is incorporated herein by reference. application Ser. No. 16/373,881, in turn, claims priority under 35 U.S.C. § 119 from U.S. Provisional Application No. 62/653,561, entitled "Modeling of Contention-free and Contention-based Random access," filed on Apr. 6, 2018, the subject matter of which is incorporated herein by reference.

TECHNICAL FIELD

The disclosed embodiments relate generally to wireless network communications, and, more particularly, to beam selection and resource allocation for random-access channel (RACH) procedure in 5G new radio (NR) wireless communications systems with beamforming.

BACKGROUND

Third generation partnership project (3GPP) and Long-Term Evolution (LTE) mobile telecommunication systems provide high data rate, lower latency and improved system performances. In 3GPP LTE networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data.

In addition to control and data channels, physical random-access channel (PRACH) is used for contention-free and contention-based random-access procedures. For contention-free RACH (CFRA) procedure, network provides dedicated PRACH resource for UE to send preamble (MSG1). Upon detecting preamble on the dedicated PRACH resource, network sends a random-access response (RAR, MSG2). Network knows who send the preamble and therefore there is no collision. For contention-based RACH (CBRA) procedure, UE randomly selects a preamble to transmit from a common PRACH resource pool. Upon detecting a preamble transmission in the contention-based PRACH resource, network then sends an RAR (MSG2). However, network does not know which UE send the preamble and UE sends UE ID in MSG3 to network. If multiple UEs select the same PRACH resource to transmit MSG1 or MSG3, RACH collision occurs. If MSG3 is decoded, then network sends MSG4 to inform UE of successful RACH procedure.

The bandwidth shortage increasingly experienced by mobile carriers has motivated the exploration of the under-utilized Millimeter Wave (mmWave) frequency spectrum around 30G and 300G Hz for the next generation 5G broadband cellular communication networks. The available spectrum of mmWave band is two hundred times greater than the conventional cellular system. The mmWave wireless network uses directional communications with narrow beams and can support multi-gigabit data rate. The under-utilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

5G new radio (NR) beamforming wireless systems support RACH procedure over different downlink beams and uplink beams. A RACH procedure can include several preamble transmission trials. For example, radio resource control (RRC) configures parameter preambleTransMax. If dedicated PRACH resource is allocated for UE, UE performs CFRA for preambleTransMax trials; otherwise, UE performs CBRA for preambleTransMax trials. In NR, a RACH procedure may include both CFRA and CBRA trials, i.e., interleaved CFRA and CBRA transmissions, if CBRA fall back is supported. However, CBRA fallback is not supported under certain scenarios.

Furthermore, to save power, NR introduces the concept of bandwidth part (BWP), which consist of a continuous range of physical resource blocks (PRB) in frequency domain and whose occupied bandwidth is the subset of the bandwidth of the associated carrier. That is, the bandwidth of a BWP in a carrier is the subset of the carrier bandwidth, where the carrier bandwidth is divided into multiple continuous frequency band with a smaller bandwidth. UE can be configured by the network with several uplink BWP and downlink BWP, and UE is required to monitor at most one uplink BWP and downlink BWP at the same time. The downlink BWP and uplink BWP which is being used/monitored by the UE is called active BWP, e.g. active downlink BWP and active uplink BWP respectively. As a result, power consumption to monitor the downlink can be reduced because UE is only required to monitoring the smaller frequency range of the active BWP, rather than monitor the whole carrier bandwidth. Each uplink bandwidth part and downlink bandwidth part have their own identifier, i.e. a BWP ID. In FDD system (i.e., a paired spectrum system), UE can be operated in an active downlink BWP and active uplink BWP with different BWP ID (e.g. using UL BWP #1 and DL BWP 2); while for TDD system (i.e., an unpaired spectrum system), UE is always operated on an uplink BWP and downlink BWP with the same BWP ID. Each uplink BWP can be optionally configured with PRACH resource. If PRACH resource is not configured, then UE cannot send random access preamble and perform random access procedure on this uplink BWP.

Solutions are sought to handle PRACH resource and beam selection when CFRA resource is non-ideal and CBRA fallback is not supported, when CFRA resource is non-ideal and active uplink BWP is not paired with downlink BWP (i.e. with the same BWP ID), and when CBRA is initiated but the active UL BWP is not configured with PRACH resource.

SUMMARY

Solutions are proposed to handle PRACH resource and beam selection under the following scenarios. First, a CFRA procedure is initiated, but all beams associated with the CFRA resource is below a RSRP threshold and CBRA fallback is not supported. UE continues to perform CFRA by selecting any downlink beam associated with dedicated PRACH resource, and then select dedicated PRACH resource associated with the selected downlink beam; second, a CFRA procedure is initiated but the active UL BWP is not paired with the active DL BWP. Upon CFRA initiation, UE uses current active UL and DL BWP to perform CFRA, and switches to another BWP pair upon all beams associated with the CFRA resource are below a RSRP threshold; third, a CBRA procedure is initiated but the active UL BWP is not configured with PRACH resource. UE selects a special UL/DL BWP to perform the CBRA procedure.

In one embodiment, a UE receives control information transmitted from a base station in a beamforming wireless communications network. The UE initiates a random-access channel procedure, where dedicated physical random-access channel (PRACH) resources associated to a set of downlink beams are configured based on the control information. The UE determines that a signal quality of each of the set of downlink beams associated with the dedicated PRACH resources is below a predefined threshold. The UE performs a contention-free random-access (CFRA) procedure by first selecting a downlink beam from the set of downlink beams associated with the dedicated PRACH resources and then select a PRACH resource associated with the selected downlink beam.

In another embodiment, a UE initiates a contention-free random-access (CFRA) procedure in a beamforming wireless communications network. The UE is configured with multiple uplink and downlink bandwidth parts (BWPs) in a carrier bandwidth. The UE monitors an active uplink BWP and an active downlink BWP. The active uplink BWP has dedicated physical random-access channel (PRACH) resources configured, and the active downlink BWP is not paired with the active uplink BWP. The UE performs the CFRA procedure on the active uplink BWP and the active downlink BWP. The UE switches to a BWP pair to perform a contention-based RACH (CBRA) procedure upon determining the dedicated PRACH resources become unavailable.

In yet another embodiment, a UE operates in an active uplink bandwidth part (BWP) and an active downlink BWP in a beamforming wireless communications network. Network may configure UE in a carrier with multiple BWPs. The UE initiates a contention-based random-access channel (CBRA) procedure. However, the active uplink BWP is not configured with physical random-access channel (PRACH) resources. The UE then selects a special uplink BWP and downlink BWP, in which the uplink BWP is configured with PRACH resources and the downlink BWP is paired with the selected uplink BWP for RACH procedure. The UE performs the CBRA procedure over the special uplink BWP and the downlink BWP.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
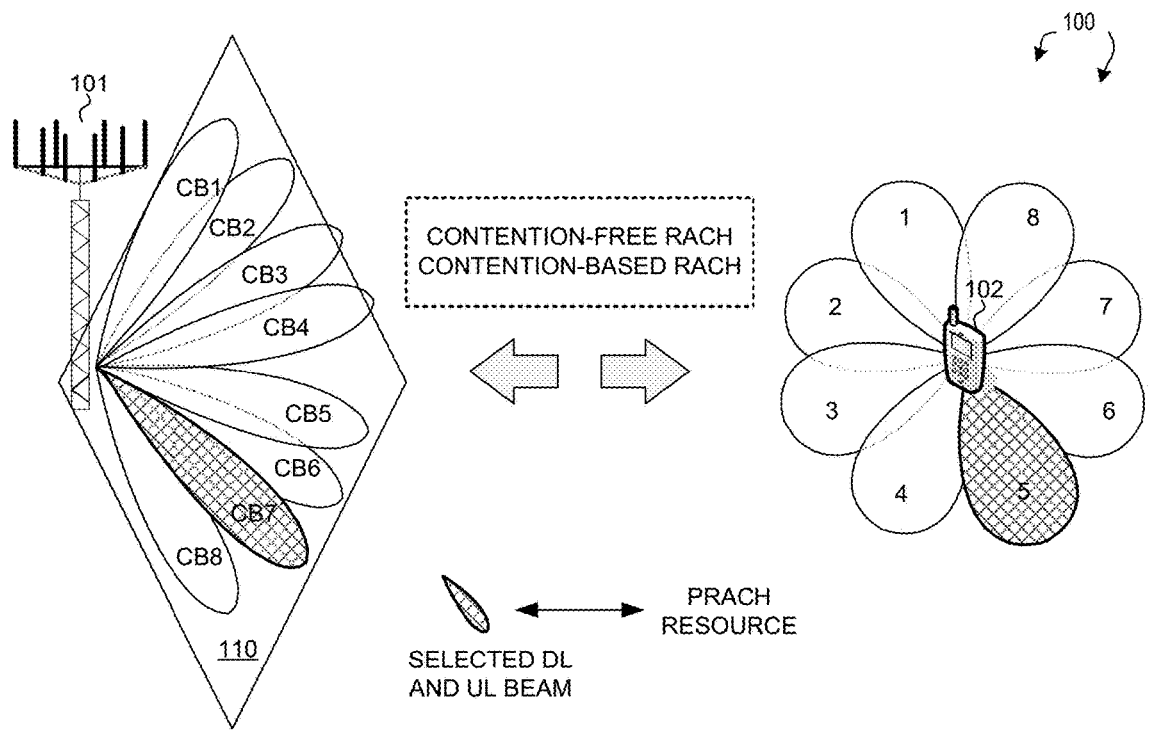
FIG. 1 illustrates a beamforming wireless communications system supporting both contention-free RACH (CFRA) and contention-based RACH (CBRA) procedures in accordance with a novel aspect.

FIG. 1 illustrates a beamforming wireless communications system 100 supporting both contention-free RACH (CFRA) and contention-based RACH (CBRA) procedures in accordance with a novel aspect. Beamforming mmWave mobile communication network 100 comprises a base station BS 101 and a user equipment UE 102. The mmWave cellular network uses directional communication with narrow beams and can support multi-gigabit data rate. Directional communication is achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of coarse TX/RX control beams. For example, cell 110 is covered by a set of eight downlink (DL) control beams CB1 to CB8. The collection of the DL beams CB1-CB8 covers an entire service area of cell 110. Each DL beam transmits a set of known reference signals for the purpose of initial time-frequency synchronization, identification of the control beam that transmits the reference signals, and measurement of radio channel quality for the control beam that transmits the reference signals. In NR systems, each of the DL beams are used to transmit a corresponding system synchronization block (SSB) or a corresponding channel state information reference signal (CSI-RS).

When there is a downlink packet to be sent from eNodeB to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI). The uplink control information (UCI) including HARQ ACK/NACK, CQI, MIMO feedback, scheduling requests is carried by a physical uplink control channel (PUCCH) or PUSCH if the UE has data or RRC signaling. Furthermore, physical random-access channel (PRACH) is used by the UE to establish connection with the base station. In NR systems, a PRACH resource includes pre-defined PRACH preambles and pre-allocated resource blocks, which are associated with corresponding DL beams.

In downlink DL-based beam management, the BS side provides opportunities for UE to measure beamformed channel of different combinations of BS TX beams CB1-CB8 and UE RX beams 1-8. For example, BS 101 performs periodic beam sweeping with reference signal (RS) carried on individual BS TX beams. UE 102 measures beamformed channel state by using different UE RX beams 1-8 and report the measurements to BS. For RACH procedure, there is an association between PRACH resource and DL beam. By UE measurements, some DL beams have lower reference signal received power (RSRP), and some DL beams have higher RSRP. The UE can select one PRACH from PRACHs associated with a DL beam above a predefined RSRP threshold to send preamble. In other words, UE uses the selected PRACH resource to implicitly inform gNB which DL beam has a better RSRP to the UE. Upon detecting the preamble, network could accordingly determine the DL beam to send random access response, i.e. network select the DL beam associated with the PRACH resource on which a preamble is detected. So, after UE receives RAR successfully, UE knows the UL beam and DL beam that can be used to communicate with the gNB.

5G new radio (NR) beamforming wireless systems support RACH procedure over different downlink beams and uplink beams. A RACH procedure can include several preamble transmission trials. For example, radio resource control (RRC) configures parameter preambleTransMax. If dedicated PRACH resource is allocated for UE, UE performs contention-free random-access (CFRA) for preambleTransMax trials; otherwise, if common PRACH resource is allocated for UE, then UE performs contention-based random-access (CBRA) for preambleTransMax trials. In NR, a RACH procedure may include both CFRA and CBRA trials, i.e., interleaved CFRA and CBRA transmissions, if CBRA fall back is supported. However, CBRA fallback is not supported under certain scenarios.

Furthermore, to save power, NR introduces the concept of bandwidth part (BWP which consist of a continuous range of physical resource blocks (PRB) in frequency domain and whose occupied bandwidth is the subset of the bandwidth of the associated carrier. That is, the bandwidth of a BWP in a carrier is the subset of the carrier bandwidth. UE can be configured by the network with several uplink BWP and downlink BWP, and UE is required to monitor at most one uplink BWP and downlink BWP at the same time. The downlink BWP and uplink BWP which is being used/monitored by the UE is called active BWP, e.g. active downlink BWP and active uplink BWP respectively. As a result, power consumption to monitor the downlink can be reduced because UE is only required to monitoring the smaller frequency range of the active BWP, rather than monitor the whole carrier bandwidth. Each uplink bandwidth part and downlink bandwidth part has its own identified, i.e. BWP ID. In FDD system (i.e., a paired spectrum system), UE can be operated in an active downlink BWP and active uplink BWP with different BWP ID (e.g. using UL BWP #1 and DL BWP 2); while for TDD system (i.e., a unpaired spectrum system), UE is always operated on an uplink BWP and downlink BWP with the same BWP ID. Each uplink BWP can be optionally configured with PRACH resource. If PRACH resource is not configured, then UE cannot send random access preamble and perform random access procedure on this uplink BWP.

In accordance with one novel aspect, solutions are proposed to handle PRACH resource and beam selection under the following scenarios. First, a CFRA procedure is initiated, but all beams associated with the CFRA resource is below a RSRP threshold and CBRA fallback is either not supported or not configured on the active UL BWP; second, a CFRA procedure is initiated, but the active UL BWP is not paired with the active DL BWP, and all beams associated with the CFRA resource may go below the RSRP threshold; third, a CBRA procedure is initiated, but the active uplink BWP is not configured with PRACH resource for the initiated CBRA procedure.

Figure 2:
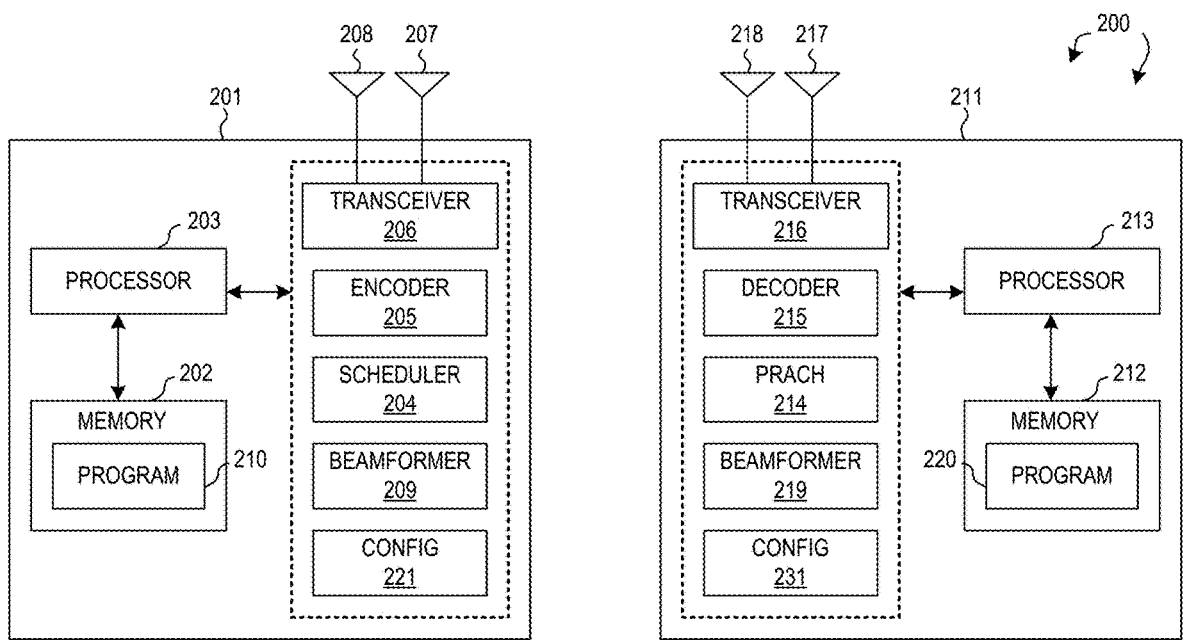
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a scheduler 204, a beamforming circuit 209, and a configuration circuit 221. Wireless device 211 is a receiving device that includes a decoder 215, a PRACH circuit 214, a beamforming circuit 219 and a configuration circuit 231. Note that a wireless device may be both a transmitting device and a receiving device. Both base station and user equipment can be a transmitting device and/or a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention accordingly.

In one example, base station 201 configures radio resource (PRACH) for UEs via configuration circuit 221, schedules downlink and uplink transmission for UEs via scheduler 204, encodes data packets to be transmitted via encoder 205 and transmits radio signals over various control beams by applying beamforming weights via beamforming circuit 209. UE 211 obtains allocated radio resources for PRACH via configuration circuit 231, receives and decodes downlink data packets via decoder 215, and transmits random access preambles over the PRACH resource via PRACH circuit 214 over a selected UL beam via beamforming circuit 219. In certain scenarios, a CFRA procedure is initiated but CBRA fallback is not supported or UL BWP has no CBRA PRACH resource configured, or UL BWP is not paired with DL BWP, or a CBRA procedure is initiated but UL BWP has no PRACH configured. In one novel aspect, PRACH handling circuit 214 selects PRACH resource and corresponding beam selection under the above scenarios for the CFRA or CBRA procedure.

Figure 3:
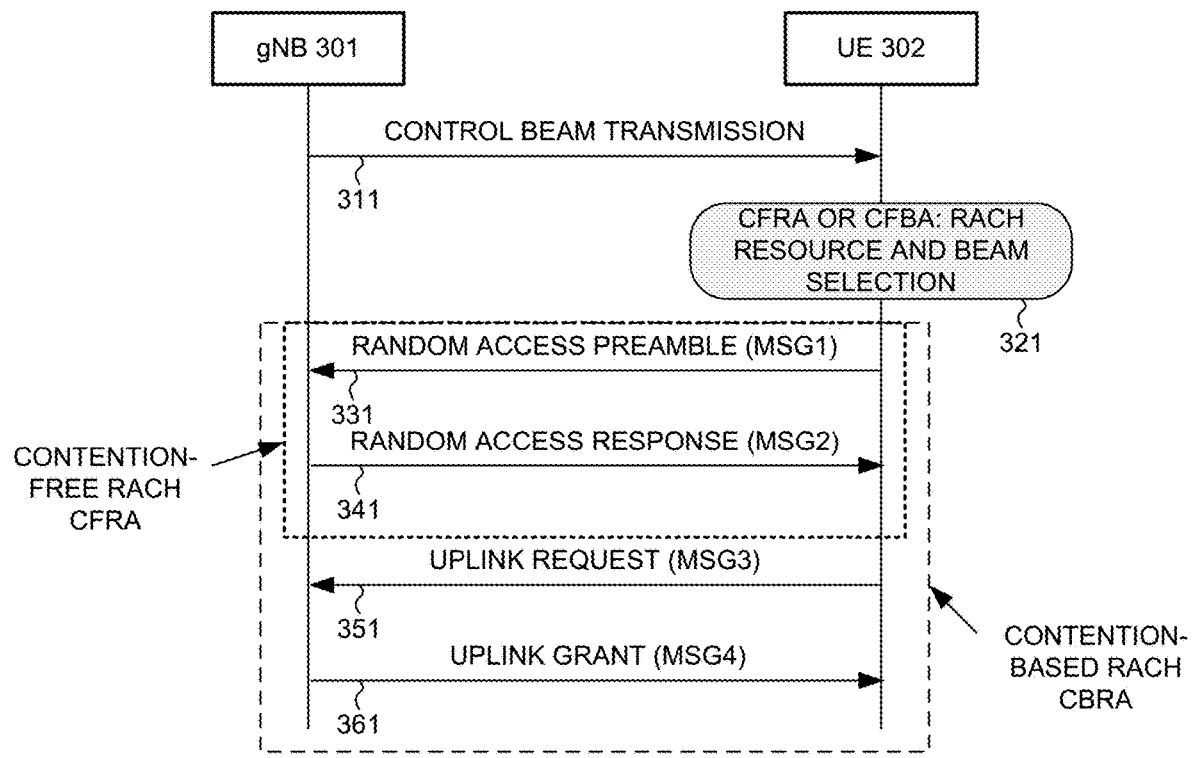
FIG. 3 illustrates a sequence flow between a base station and a user equipment for performing CFRA and CBRA in a beamforming wireless system.

FIG. 3 illustrates a sequence flow between a base station and a user equipment for performing CFRA and CBRA in a beamforming wireless system. In step 311, gNB 301 transmits SS blocks (SSB) system information (SI) and CSI-RS reference signals to UE 302 over corresponding DL beams. The DL beams have an association with PRACH resources, e.g., PRACH preambles and resource blocks. In step 321, UE 302 prepares for RACH procedure: determines CFRA or CBRA procedure and decides PRACH resource and UL/DL beam selection. For CFRA procedure, in step 331, UE 302 transmits PRACH preamble (MSG1) to gNB 301 using one of UE-specific PRACH resources, each of which is associated with a specific DL beam. After selecting PRACH resource, UE sends a preamble on the selected PRACH and a specific UL beam (UL direction), which is selected by UE itself. If UE fails in preamble transmission, then for the next preamble retransmission, UE can select a new PRACH associated with the same or different DL beam, and then send the preamble in the PRACH with a different UL beam (UL direction). In step 341, upon receiving the PRACH preamble, gNB 301 transmits random access response (RAR, MSG2) back to UE 302 using a DL beam. The DL TX beam for MSG2 can be obtained based on the PRACH resource on which the PRACH preamble transmission is detected, and the association between PRACH resource and DL beam. For CFRA, the RACH procedure is completed because the network knows who send the preamble, i.e. only the UE configured with the dedicated PRACH will send preamble on this PRACH.

For CBRA procedure, UE 302 continues with step 351 and sends an uplink request with UE identification (MSG3) to gNB 301 using the select UL beam. In step 361, gNB 301 sends a message as a response to MSG3 (i.e. MSG4) to UE 302 for contention resolution, and completes the CBRA RACH procedure. Either CFRA or CBRA RACH procedure can include several preamble transmission trials. For example, RRC signaling configures parameter preamble-TransMax. In step 321, UE 302 determines to initiate CFRA or CBRA based on different network scenarios and conditions.

Figure 4:
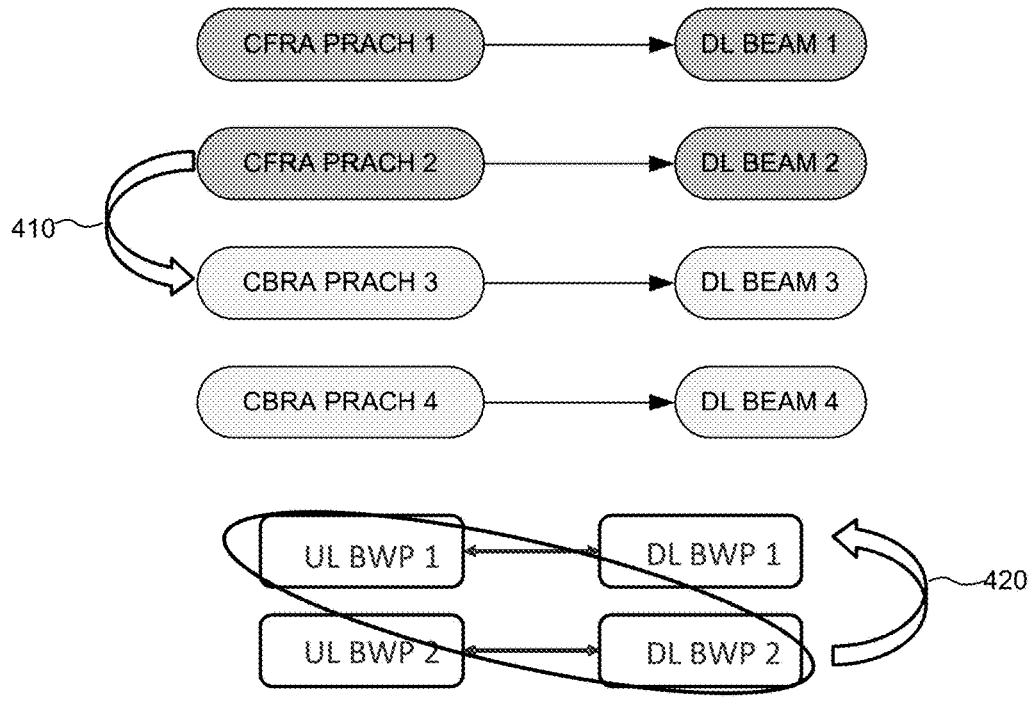
FIG. 4 illustrates examples of supporting CFRA and CBRA and bandwidth part (BWP) operation in a beamforming wireless system.

FIG. 4 illustrates examples of supporting both CFRA and CBRA and bandwidth part (BWP) operation in a beamforming wireless system. In NR beamforming systems, there is association between PRACH resource and DL beams (SSB or CSI-RS). As depicted in FIG. 4, CFRA PRACH 1 is associated with DL beam 1, CFRA PRACH 2 is associated with DL beam 2, CBRA PRACH 3 is associated with DL beam 3, and CBRA PRACH 4 is associated with DL beam 4. To have a good communication, UE will send preamble on the PRACH which is associated with a good quality (high RSRP) DL beam. In this way, upon detecting the preamble, network will send RAR on the DL beam associated with the PRACH resource, and UE can successfully receive RAR because the DL beam network use to send RAR is though with high RSRP to the UE. In CFRA, if UE finds that all the dedicated PRACH resource for CFRA are associated with beam below RSRP threshold, then if UE still send preamble on those dedicated CFRA resource, network may transmit RAR on a bad RSRP DL beam, and RACH may thus fail.

CBRA fallback means that when all DL beams are below RSRP threshold, UE is allowed to send preamble on PRACH resource from contention-based PRACH resource pool rather than always select PRACH resource from dedicated PRACH resource (410). Besides, if UE perform CBRA fallback and use contention-based PRACH resource for preamble retransmission, and during PRACH reselection for preamble retransmission, if UE finds that during channel variation one or more DL beams associated with any dedicated PRACH resource change to have better RSRP above the RSRP threshold again, UE should turn from CBRA back to CFRA, and perform CFRA again (i.e. perform CFRA by using the dedicated PRACH resource). As a result, if CBRA fallback is supported, a RACH procedure may switch between CFRA and CBRA, and therefore include both CFRA and CBRA trials, i.e. interleaved CFRA and CBRA transmission. Note that when CBRA fall back happens, the RACH procedure is ongoing and preamble transmission counter continues, and the only difference is that UE moves to used contention-based common PRACH resources in a 4-step RACH procedure. In other words, both CFRA and CBRA belong to part of the same RACH procedure. However, CBRA is not supported in every scenario of RACH procedure.

To save power, NR introduce the concept of BWP (bandwidth part). A bandwidth part is a continuous frequency band whose bandwidth is smaller than the carrier bandwidth. UE can be configured to monitor smaller bandwidth to reduce power consumption. A UE can be configured with at most 4 UL BWP and 4 DL BWP. A UE is required to monitor one UL BWP and DL BWP at a time. For example, as depicted in FIG. 4, UE can be operated to monitor UL BWP 1 and DL BWP 2. During CBRA RACH procedure, upon receiving preamble on UL BWP 1, since network does not know which UE sends the preamble (i.e. preamble is just a physical sequence and does not carry UE ID), the network cannot determine how which DL BWP the RAR should be send, which is DL BWP 2. In addition to this problem, the active UL BWP may not support CBRA fall back and may not have PRACH configured. Switching the active BWP thus may be needed (420).

Figure 5:
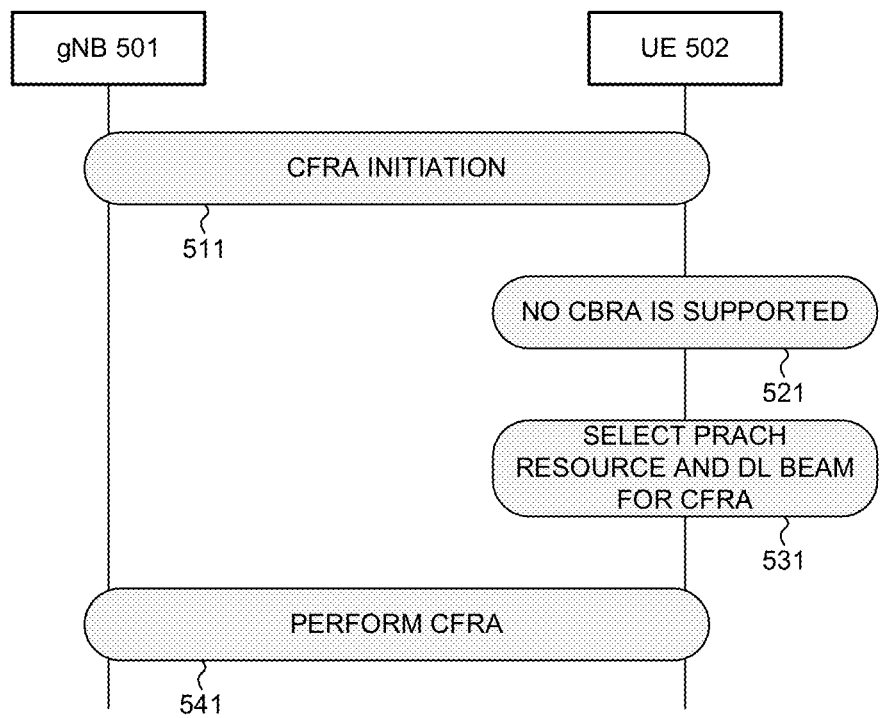
FIG. 5 illustrates a first embodiment of PRACH resource and beam selection for beamformed random-access in accordance with one novel aspect.

FIG. 5 illustrates a first embodiment of PRACH resource and beam selection for beamformed random-access in accordance with one novel aspect. In step 511, gNB 501 or UE 502 initiates a CFRA procedure for random access. In step 521, UE 502 discovers that CBRA fallback is not supported. Under different scenarios this may happen. First, a network initiated CFRA procedure (i.e. PDCCH order triggered CFRA) on either SPCELL or SCELL does not support CBRA fallback. Second, a UE initiated CFRA procedure for MSG1-based SI (system information) request does not support CBRA fallback. This is because there are already dedicated PRACH resources on each SSBs configured for each SI message supporting MSG1-based request. Third, UE 502 currently monitors an active uplink BWP, which has no contention-based PRACH resource configured. In addition, UE 502 detects that all beams associated with CFRA resources are below a predefined RSRP threshold. In step 531, UE 502 selects a dedicated PRACH resource associated with any downlink beam even if each dedicated PRACH resource is associated with a downlink beam below the RSRP threshold. The downlink beam may be selected based on its RSRP level, e.g., the downlink beam selected for PRACH transmission is the one with a relatively higher RSRP among all those downlink beams which are all associated with some dedicated PRACH and are below RSRP threshold. In step 541, UE continues to perform CFRA procedure using the selected dedicated PRACH resource and downlink beam without trying CBRA fallback.

In addition to selecting one DL beam from those below RSRP threshold as illustrated above, there are some other alternatives. For example, when UE detects that all the DL beams associated with dedicated PRACH resource are below RSRP threshold, UE stops the RACH procedure, and optionally indicates the random-access problem to the upper layer, or waits for handling from the network. The reason is because all the DL beams are below RSRP threshold, so even when network can detect the preamble transmitted by the UE, the random-access response cannot be successfully received by the UE via one of those low-RSRP DL beam. Therefore, to avoid power wasting, UE should stop RACH procedure when all DL beams associated with dedicated PRACH resource are below the RSRP threshold. Yet another alternative is that when all DL beams associated with dedicated PRACH resource are below the RSRP threshold, UE stops the ongoing CFRA, and triggers another contention-based RACH procedure. The rationale is that since CBRA fallback is not allowed, UE just ignore the configured dedicated PRACH resource, i.e. by re-initiating a new CBRA procedure, UE may have high-RSRP beam to be selected, which is not associated with any of the dedicated PRACH configured by the network.

Figure 6:
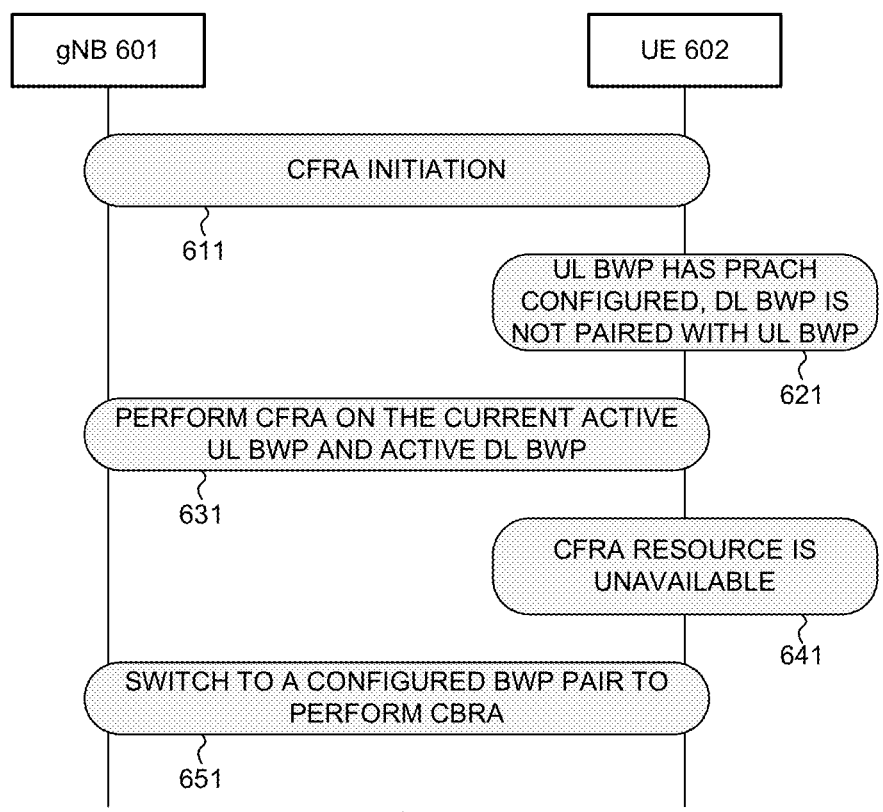
FIG. 6 illustrates a second embodiment of PRACH resource and beam selection for beamformed random-access in accordance with one novel aspect.

FIG. 6 illustrates a second embodiment of PRACH resource and beam selection for beamformed random-access in accordance with one novel aspect. In step 611, gNB 601 or UE 602 initiates a CFRA procedure for random access. UE 602 monitors an active UL BWP and DL BWP to reduce power. In step 621, UE 602 discovers that although the current active uplink BWP has contention-based PRACH resource configured, the active downlink BWP is not paired with the uplink BWP having the same BWP ID. As a result, if CBRA fallback is necessary, then UE 602 would not be able to perform CBRA procedure on the current active UL and DL BWP. In step 631, UE 602 continues the CFRA procedure on the current active UL and DL BWP. In step 641, UE 602 detects that all beams associated with CFRA resources are below a predefined RSRP threshold. In step 651, UE 602 switches to another configured BWP pair to perform the CBRA procedure for CBRA fallback. Note that in this embodiment, UE 602 does not switch to another BWP pair after step 621. Instead, UE 602 continues the CFRA procedure in step 631, and switches to another BWP pair only if all beams associated with CFRA resources are below a predefined RSRP threshold after step 641.

Figure 7:
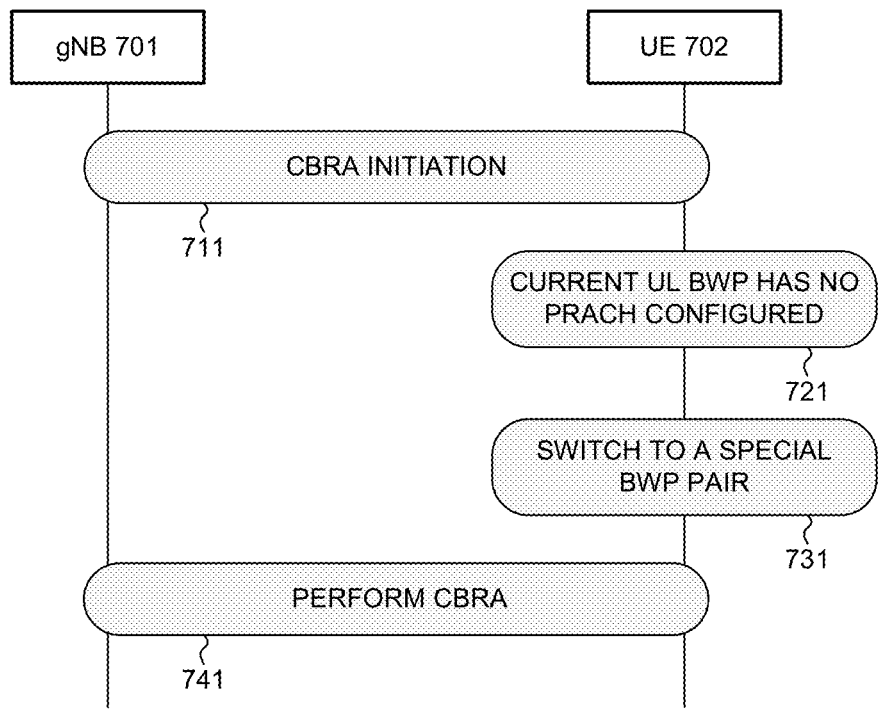
FIG. 7 illustrates a third embodiment of PRACH resource and beam selection for beamformed random-access in accordance with one novel aspect.

FIG. 7 illustrates a third embodiment of PRACH resource and beam selection for beamformed random-access in accordance with one novel aspect. In step 711, gNB 701 or UE 702 initiates a CBRA procedure for random access. UE 702 monitors an active UL BWP and DL BWP to reduce power. In step 721, UE 702 discovers that the current active UL BWP has no PRACH resource configured. As a result, UE 702 would not be able to perform the CBRA procedure on the current active UL BWP. In step 731, UE 702 switches to a special UL BWP and DL BWP supporting CBRA. In one example, the special UL BWP and DL BWP form a specific BWP pair having the same BWP ID as configured by the network. In another example, the special UL BWP and DL BWP form one of the BWP pairs having the same BWP ID as configured by the network, and is the special BWP pair is the most UE power efficient. In step 741, UE 702 performs the CBRA on the special UL BWP and DL BWP.

Figure 8:
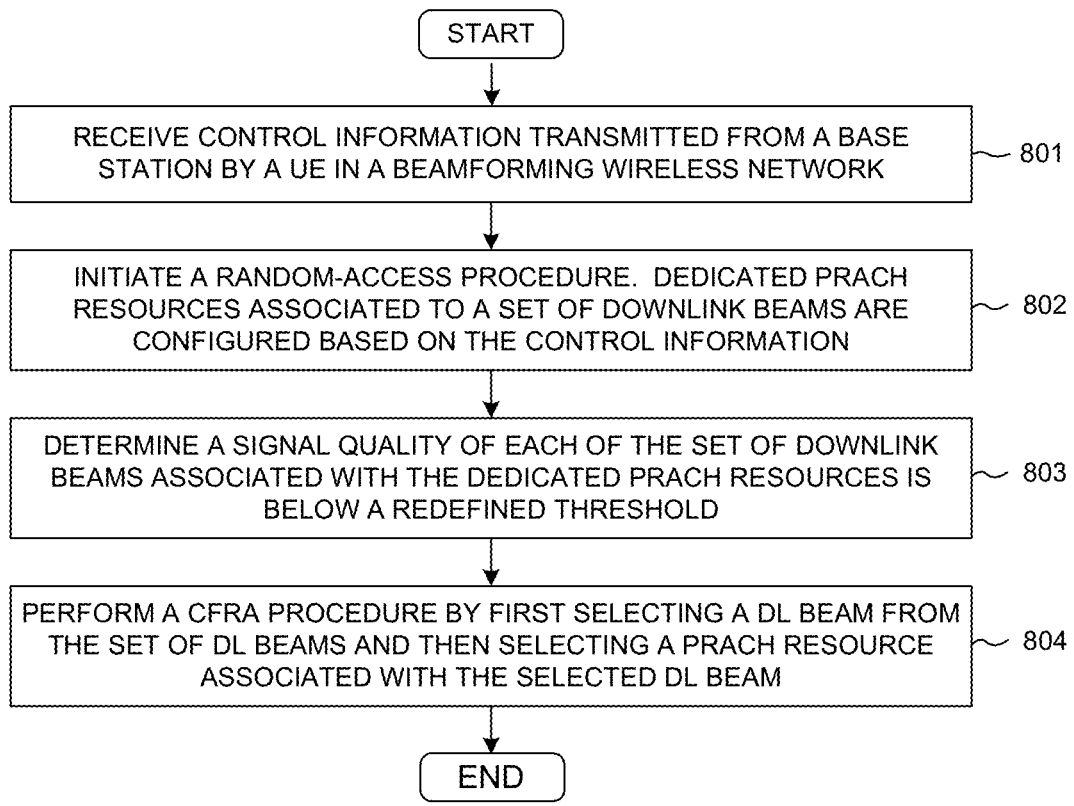
FIG. 8 is flow chart of a method of PRACH resource and beam selection for CFRA when CBRA fallback is not supported in a beamforming wireless communication system in accordance with one novel aspect.

FIG. 8 is flow chart of a method of PRACH resource and beam selection for CFRA when CBRA fallback is not supported in a beamforming wireless communication system in accordance with one novel aspect. In step 801, a UE receives control information transmitted from a base station in a beamforming wireless communications network. In step 802, the UE initiates a random-access channel procedure, where dedicated physical random-access channel (PRACH) resources associated to a set of downlink beams are configured based on the control information. In step 803, the UE determines that a signal quality of each of the set of downlink beams associated with the dedicated PRACH resources is below a predefined threshold. In step 804, the UE performs a contention-free random-access (CFRA) procedure by first selecting a downlink beam from the set of downlink beams associated with the dedicated PRACH resources and then select a PRACH resource associated with the selected downlink beam.

Figure 9:
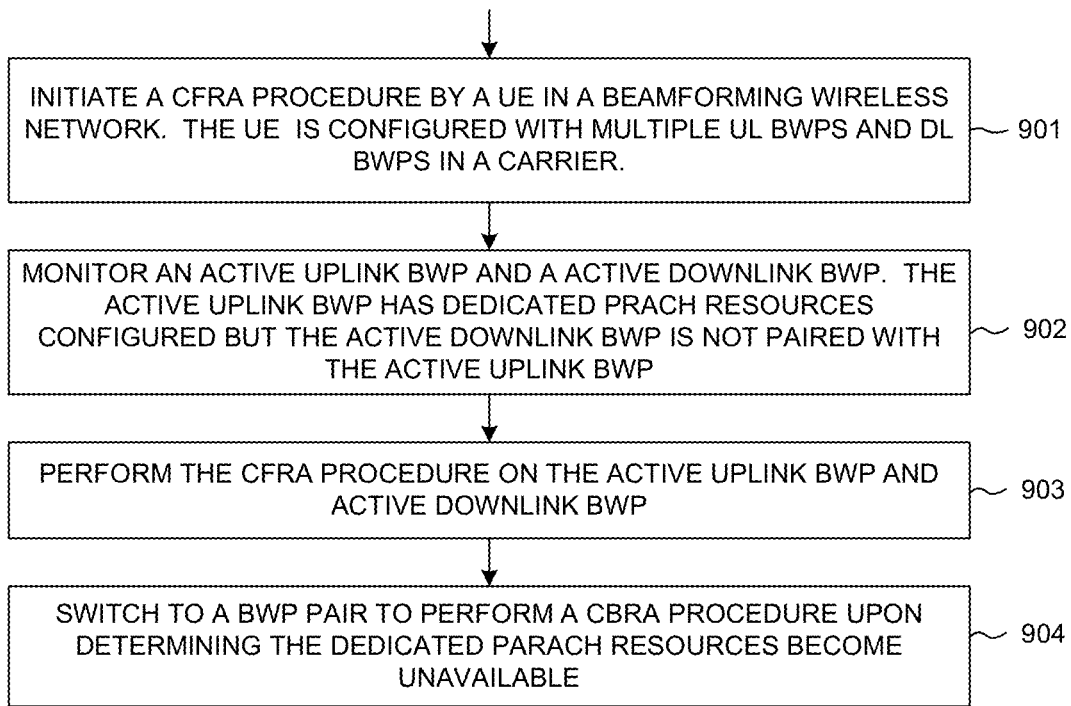
FIG. 9 is a flow chart of a method of PRACH resource and beam selection for CFRA when UL BWP is not paired with DL BWP in a beamforming wireless communication system in accordance with one novel aspect.

FIG. 9 is a flow chart of a method of PRACH resource and beam selection for CFRA when UL BWP is not paired with DL BWP in a beamforming wireless communication system in accordance with one novel aspect. In step 901, a UE initiates a contention-free random-access (CFRA) procedure in a beamforming wireless communications network. The UE is configured with multiple uplink and downlink bandwidth parts (BWPs) in a carrier bandwidth. In step 902, the UE monitors an active uplink BWP and an active downlink BWP. The active uplink BWP has dedicated physical random-access channel (PRACH) resources configured, and the active downlink BWP is not paired with the active uplink BWP. In step 903, the UE performs the CFRA procedure on the active uplink BWP and the active downlink BWP. In step 904, the UE switches to a BWP pair to perform a contention-based RACH (CBRA) procedure upon determining the dedicated PRACH resources become unavailable.

Figure 10:
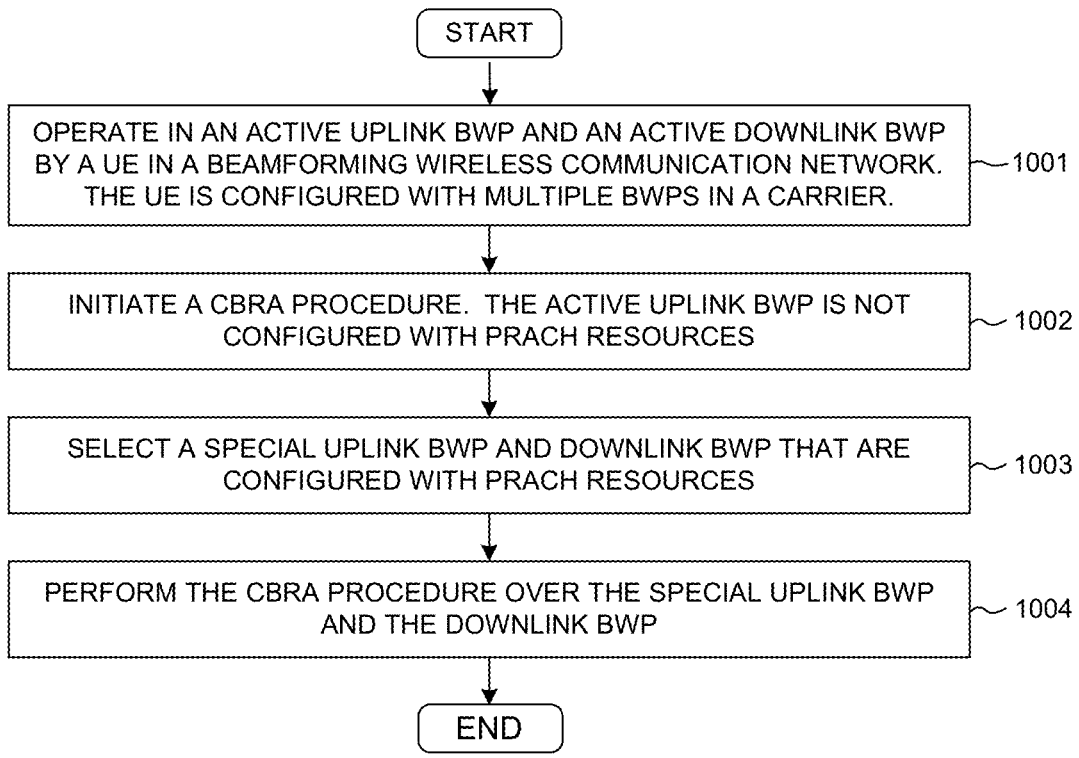
FIG. 10 is a flow chart of a method of performing CBRA when active UL BWP has no PRACH resources configured in a beamforming wireless communication system in accordance with one novel aspect.

FIG. 10 is a flow chart of a method of performing CBRA when active UL BWP has no PRACH resources configured in a beamforming wireless communication system in accordance with one novel aspect. In step 1001, a UE operates in an active uplink bandwidth part (BWP) and an active downlink BWP in a beamforming wireless communications network. UE is configured with multiple bandwidth parts (BWPs) in a carrier. In step 1002, the UE initiates a contention-based random-access channel (CBRA) procedure. The active uplink BWP is not configured with physical random-access channel (PRACH) resources. In step 1003, the UE selects a special uplink BWP and downlink BWP, in which the uplink bandwidth part is configured with PRACH resources, and the downlink BWP is paired with the uplink bandwidth part, i.e. with the same BWP ID. In step 1004, the UE performs the CBRA procedure over the special uplink BWP and the downlink BWP.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving control information transmitted from a base station by a user equipment (UE) in a wireless communications network;
   initiating a random-access procedure on a serving cell, wherein dedicated physical random-access channel (PRACH) resources and a set of downlink beams are configured by the network based on the control information; and
   performing a contention-free random access (CFRA) procedure on an active uplink bandwidth part (BWP) of a selected carrier of the serving cell by first selecting a downlink beam from the set of downlink beams and the dedicated PRACH resources configured by the network, and then selecting a PRACH resource associated with the selected downlink beam, wherein the UE continues the CFRA procedure on the active uplink BWP by selecting each PRACH resource from the dedicated PRACH resources for each random access preamble transmission, wherein the uplink BWP has no contention-based PRACH resource configured for the UE.

2. The method of claim 1, wherein the CFRA procedure does not support contention-based RACH (CBRA) fallback.

3. The method of claim 1, wherein the CFRA procedure is triggered by a Physical Downlink Control Channel (PDCCH) order from the base station.

4. The method of claim 3, wherein the serving cell and the selected carrier of the serving cell are both indicated by a downlink control information (DCI) in the PDCCH order.

5. A User Equipment (UE) comprising:
   a receiver that receives control information transmitted from a base station in a wireless communications network; and
   a random-access procedure handling circuit that initiates the random-access procedure on a serving cell, wherein dedicated physical random-access channel (PRACH) resources and a set of downlink beams are configured by the network based on the control information, wherein the UE performs a contention-free random access (CFRA) procedure on an active uplink bandwidth part (BWP) of a selected carrier of the serving cell by first selecting a downlink beam from the set of downlink beams and the dedicated PRACH resources configured by the network, and then selects a PRACH resource associated with the selected downlink beam, wherein the UE continues the CFRA on the active uplink BWP by selecting each PRACH resource from the dedicated PRACH resources for each random access preamble transmission, wherein the uplink BWP has no contention-based PRACH resource configured for the UE.

6. The UE of claim 5, wherein the CFRA procedure does not support contention-based RACH (CBRA) fallback.

7. The UE of claim 5, wherein the CFRA procedure is triggered by a Physical Downlink Control Channel (PDCCH) order from the base station.

8. The UE of claim 7, wherein the serving cell and the selected carrier of the serving cell are both indicated by a downlink control information (DCI) in the PDCCH order.

* * * * *